United States Patent
Laberis

(10) Patent No.: US 6,446,914 B1
(45) Date of Patent: Sep. 10, 2002

(54) SPACE SAVING WIREWAY HANGER

(75) Inventor: George A. Laberis, Burlington, MA (US)

(73) Assignee: Samtan Engineering Corporation, Malden, MA (US)

( * ) Notice: Subject to any disclaimer, the term of this patent is extended or adjusted under 35 U.S.C. 154(b) by 0 days.

(21) Appl. No.: 09/650,440

(22) Filed: Aug. 29, 2000

(51) Int. Cl.$^7$ .................................................. F16L 3/23
(52) U.S. Cl. ........................................ 248/49; 248/58
(58) Field of Search ............................ 248/49, 58, 235, 248/250, 906

(56) References Cited

U.S. PATENT DOCUMENTS

| | | | | |
|---|---|---|---|---|
| 4,960,253 A | * | 10/1990 | Perrault et al. | 248/68.1 |
| 5,118,066 A | * | 6/1992 | Perrault et al. | 248/333 |
| 5,393,020 A | * | 2/1995 | Perrault et al. | 248/68.1 |

* cited by examiner

*Primary Examiner*—Daniel P. Stodola
*Assistant Examiner*—Erica B. Harris
(74) *Attorney, Agent, or Firm*—Morse, Altman & Martin

(57) ABSTRACT

A horizontally elongated wireway hanger of U-cross-section has an integral configuration of sections, i.e. tab and flange, which fit the wireway snugly and securely against a vertically elongated wireway downcomer of U-cross-section. Each U-cross-section is characterized by opposed walls connected by an intermediate saddle. The surfaces of the sections are free from each other, i.e. are not contiguous other than being integrally joined at certain edges. Along the saddle of the downcomer are a series of holes. Along the saddle of the hanger are a series of transverse slots. At least one tab lies in the geometrical plane of the forward wall of the hanger and includes a hole, which is registrable with a hole of selected height in the saddle of the downcomer and by which the hanger may be bolted to the downcomer. A series of parallel transverse slots in the saddle of the hanger is adapted to receive strapping by which a load of conduits may be secured to the hanger. One or more flanges lie in a geometrical plane that is orthogonal with respect to the forward wall of the hanger and have edges that snugly contact walls of the downcomer. The planar expanse of the flanges acts to absorb shock and vibration.

11 Claims, 9 Drawing Sheets

SPACE SAVING WIREWAY HANGER

BACKGROUND OF THE INVENTION

1. Field of the Invention

The present invention relates to wireways that support heavy loads of cables or other electrical and/or mechanical conduits in constructions of various types, particularly in nautical constructions. More particularly, the present invention relates to hangers, which are designed to be bolted to predeterminedly shaped and displaced vertical metal columns in such constructions. One type of such column, called a "downcomer", is U-shaped in cross-section and is welded to the underside of a metal deck or the like of a ship.

2. The Prior Art

Wireways, particularly those in naval vessels, must meet exacting standards. They are required to support loads of cables of various sizes and weights and to secure such loads against forces resulting from motion and vibration. Space is limited so that such loads often are dense and heavy.

Mounted at sequential heights along the downcomers are hangers, i.e. crosspieces. These hangers carry the bundles of cabes and are provided with (1) openings that can be registered with openings in the downcomers for the reception of bolts, and (2) slots that can accommodate metal straps for tying bundles of cables to the hangers. Improved stability and simplicity always are imperatives in wireway design.

SUMMARY OF THE INVENTION

The object of the present invention is to provide a particularly configured, horizontally elongated wireway hanger that is designed to be mated with a conventional vertically elongated downcomer. Both the downcomer and the hanger are channels that are generally U-shaped in cross-section, each having as integral components a saddle portion and a pair of equally deep wall portions extending orthogonally therefrom. Integral with and extending from one of the wall portions is an arrangement of flanges that snugly abut against the saddle and wall portions of the downcomer. The saddle portion of the downcomer has a series of holes. For registration with one of these holes is a hole in one of the flanges and/or associated wall portion of the hanger, by which the hanger may be securely bolted to the downcomer. A series of parallel transverse slots in the saddle portion of the hanger is adapted to receive strapping by which a load of cables carried by the hanger may be secured thereto. The arrangement is such that mating particularly configured hangers of the present invention with conventional downcomers produces a wireway that is unusually simple to produce and to assemble an unusually tight and secure in operation.

Other objects of the present invention will in part be obvious and will in part appear hereinafter.

BRIEF DESCRIPTION OF THE DRAWINGS

For a fuller understanding of the nature and objects of the present invention, reference is made to the following specification, which is to be taken in connection with the accompanying drawings wherein.

DETAILED DESCRIPTION OF THE PREFERRED EMBODIMENTS

Figure 1:
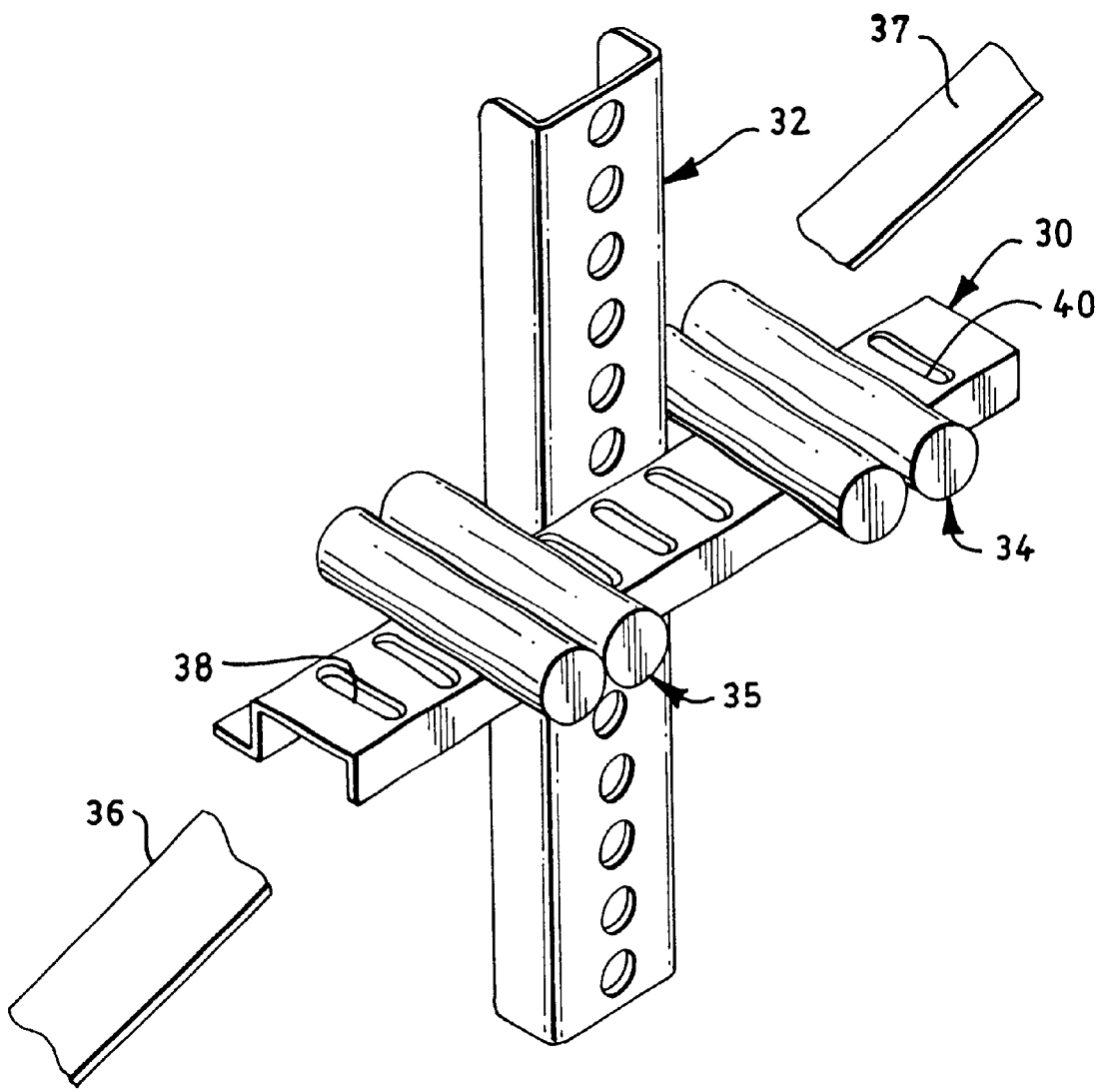
FIG. 1 is a perspective view of a wireway assemblage illustrating the operation of the present invention.
Figure 2:
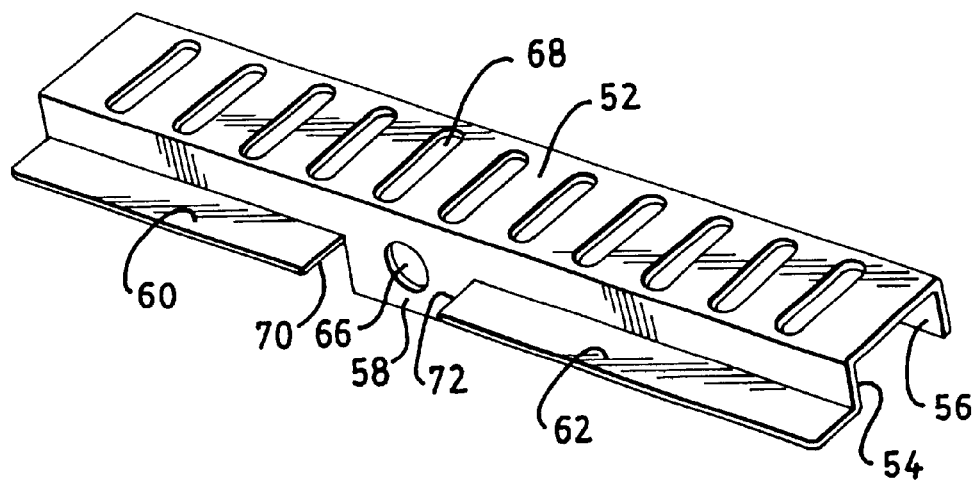
FIG. 2 is a perspective view of one embodiment of a hanger pursuant to the present invention.

The Assemblage of FIG. 1

The wireway assemblage of FIG. 1, in accordance with the present invention, comprises a horizontally elongated crossbar hanger 30 that is mated with a conventional vertically elongated channel downcomer 32. Both the downcomer and the hanger are channels that are generally U-shaped in cross-section. Resting on hanger 30 are bundles of cables 34 and 35, which are bound tightly to the hanger by straps 36 and 37, respectively. These straps are threaded through a series of slots 38 in the hanger and tie the cables to the hanger. Typically, hanger 30 is stamped from a sheet of mild steel, aluminum or stainless steel that ranges in thickness from 112 to 127 mils.

The Embodiment of FIGS. 2–6

The wireway assemblage of FIGS. 2–6, in accordance with the present invention, comprises a horizontally elongated crossbar hanger 42 that is designed to be mated with a conventional vertically elongated channel downcomer 44. Both the downcomer and the hanger are channels that are generally U-shaped in cross-section.

Downcomer 44 has, as integral components, a saddle portion 46 and a pair of equally deep wall portions 48 and 50 extending orthogonally therefrom. Hanger 42 has as integral components a saddle portion 52 and a pair of equally deep wall portions 54 and 56 extending orthogonally therefrom.

Integral with and extending from wall portion 54 is an arrangement of flanges 58, 60 and 62. Flange 58 extends downwardly from wall porton 54 in the same plane as does wall 54. Flanges 60 and 62 extend orthogonally in the same plane from wall 54 on opposite sides of flange 58.

The saddle portion of the downcomer has a series of holes 64. For registration with one of these holes is a hole 66 in the adjacent regions of flange 58 and the associated wall portion of the hanger. A series of parallel transverse slots 68 in the saddle of the hanger are adapted to receive strapping by which a load of conduits may be secured to the hanger.

Figure 3:
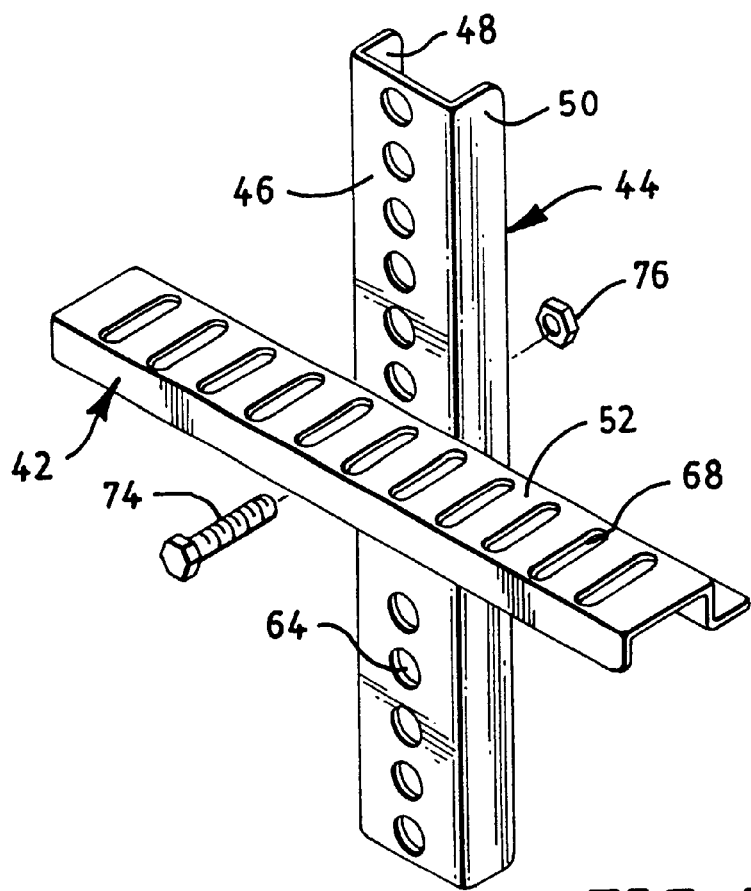
FIG. 3 is a perspective view of a partially assembled wireway incorporating the hanger of FIG. 2.
Figure 4:
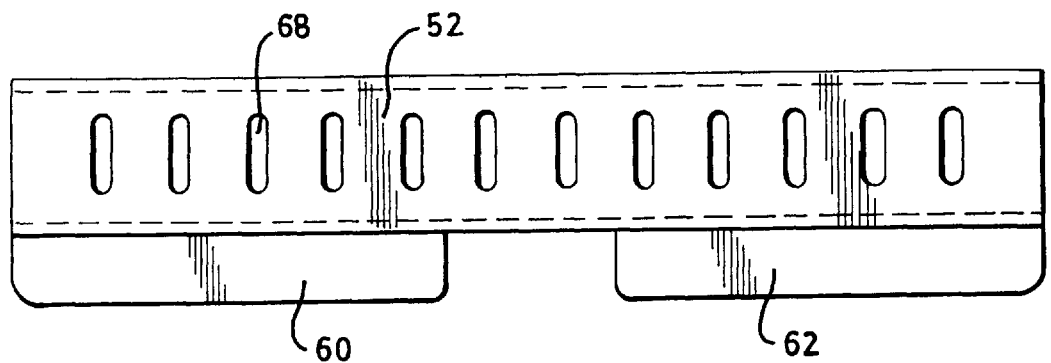
FIG. 4 is a top plan view of the hanger of FIG. 2.
Figure 5:
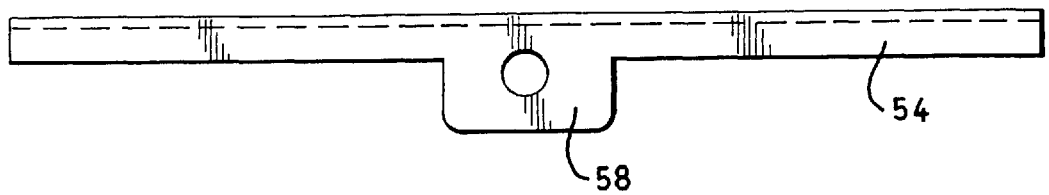
FIG. 5 is a front view of the hanger of FIG. 2.
Figure 6:
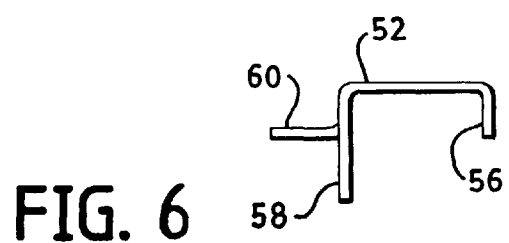
FIG. 6 is an end view of the hanger of FIG. 2.
Figure 7:
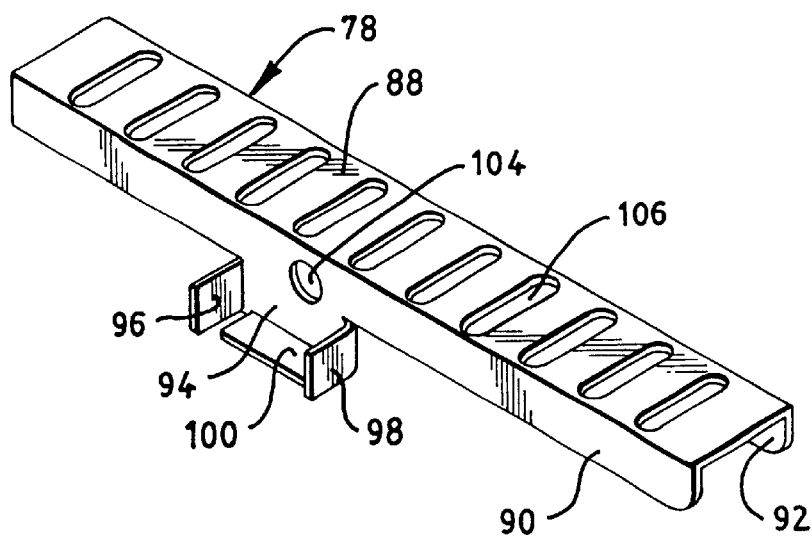
FIG. 7 a perspective view of another embodiment of a hanger pursuant to the present invention.

When downcomer 44 and hanger 42 are assembled, as shown in FIG. 3, the inner edges 70 and 72 of flanges 60 and 62, respectively, snugly receive the outer faces of the walls of downcomer 44, and the free edge of flange 58 abuts against the inner face of the saddle portion of downcomer 44, with its hole 66 registered with a hole 64 of the saddle portion of the downcomer. When the downcomer and the hanger are mated, a single bolt 74 and a nut 76 are all that is required for an extremely tight and sturdy wireway assemblage.

The Embodiment of FIGS. 7–11

The wireway assemblage of FIGS. 7–11, in accordance with the present invention, comprises a horizontally elongated crossbar hanger 78 that is designed to be mated with a conventional vertically elongated channel downcomer 80. Both the downcomer and the hanger are channels that are generally U-shaped in cross-section.

Downcomer 80 has, as integral components, a saddle portion 82 and a pair of equally deep wall portions 84 and 86 extending orthogonally therefrom. Hanger 78 has, as integral components, a saddle portion 88 and a pair of equally deep wall portions 90 and 92 extending orthogonally therefrom.

Integral with and extending from wall portion 90 is an arrangement of flanges 94, 96, 98 and 100. Flange 94 extends downwardly from wall 90 in the same plane as does wall 90. Flanges 96 and 98 extend orthogonally in parallel planes from the opposite sides of flange 94. Flange 100 extends orthogonally from the lower edge of flange 94 and between flanges 96 and 98.

The saddle portion of the downcomer has a series of holes 102. For registration with one of these holes is a hole 104 in the adjacent regions of flange 94 and the associated wall portion of the hanger. A series of parallel transverse slots 106 in the saddle of the hanger are adapted to receive strapping, by which loads of cables may be secured to the hanger.

Figure 8:
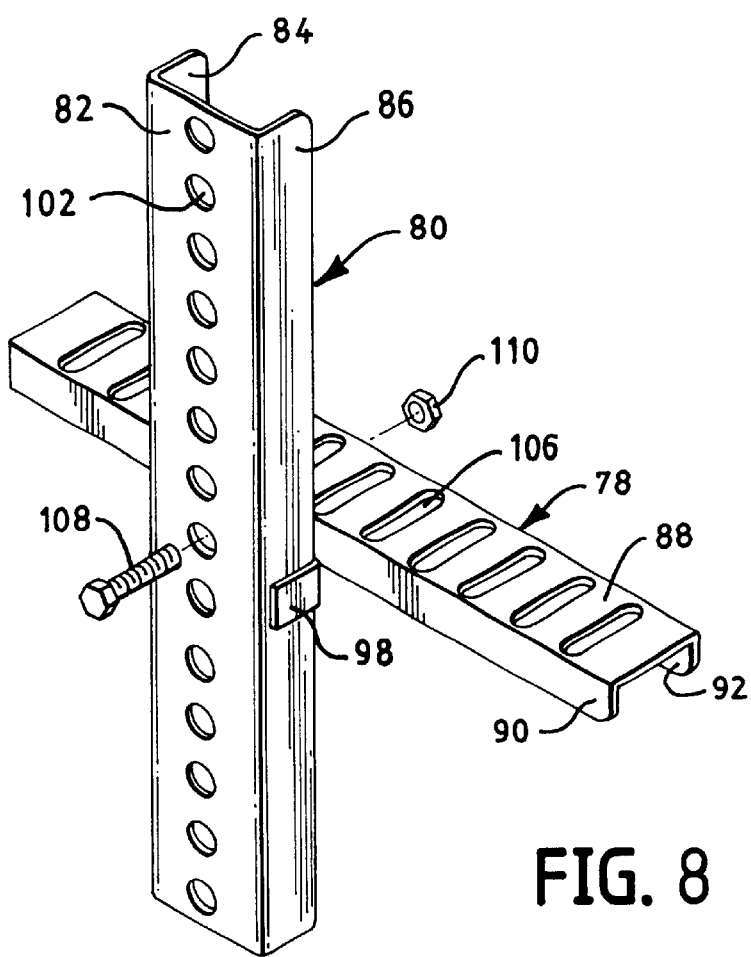
FIG. 8 is a perspective view of a partially assembled wireway incorporating the hanger of FIG. 7.
Figure 9:
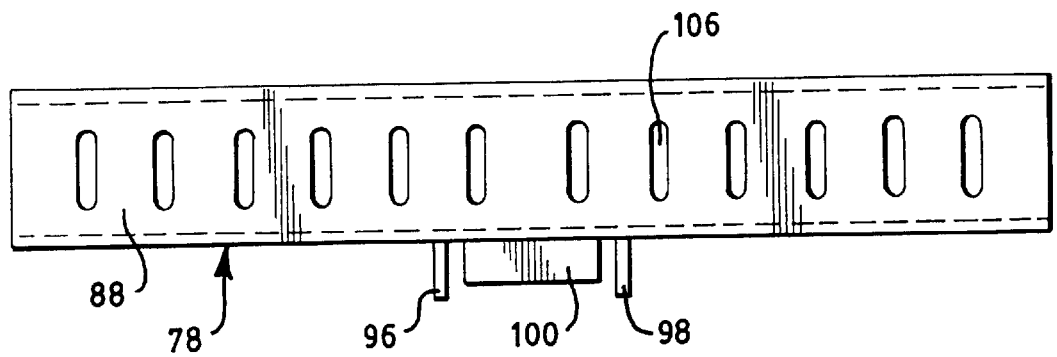
FIG. 9 is a top plan view of the hanger of FIG. 7.
Figure 10:
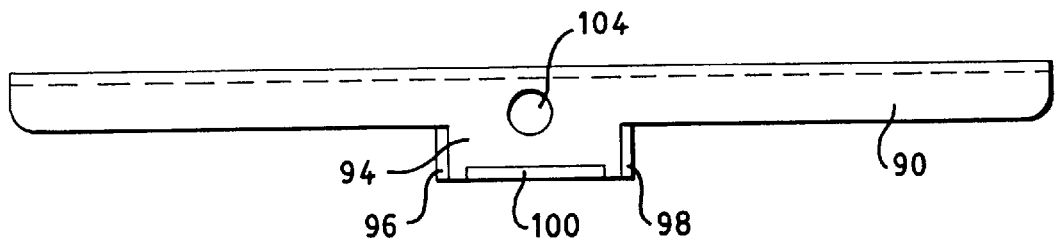
FIG. 10 is a front view of the hanger of FIG. 7.
Figure 11:
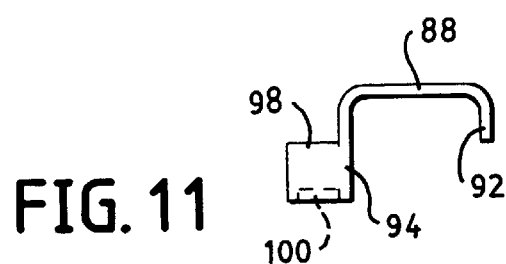
FIG. 11 is an end view of the hanger of FIG. 7.

When downcomer 80 and hanger 78 are mated, as shown in FIG. 8, the inner faces of flanges 96 and 98 snugly receive the walls of downcomer 80, and the free edge of flange 100 abuts against the inner face of the saddle portion of downcomer 80. In this relationship, hole 104 is registered with a hole 102 for reception of a bolt 108. When the downcomer and the hanger are fastened together by bolt 108 and a nut 110, the assemblage is extremely tight and sturdy.

Figure 12:
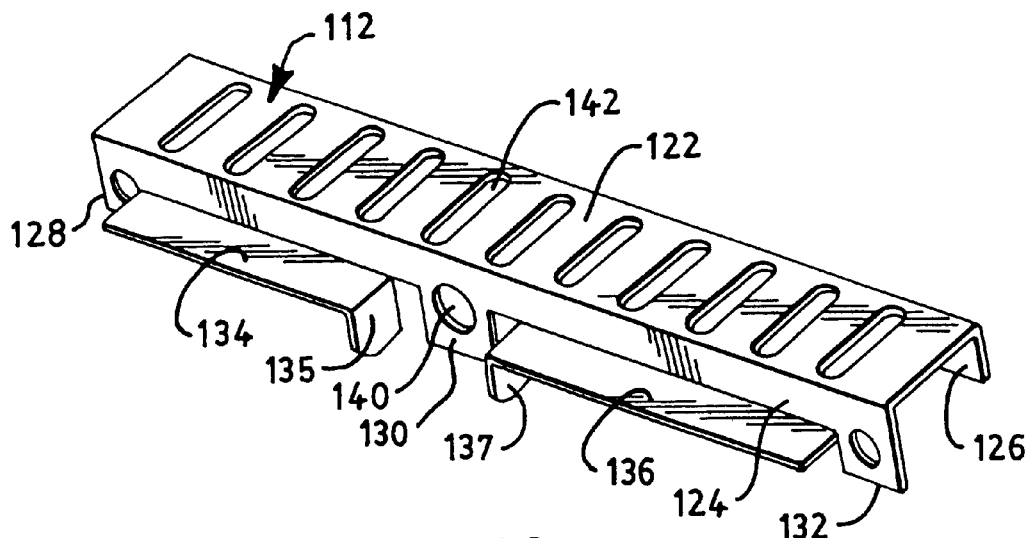
FIG. 12 is a perspective view of a further embodiment of a hanger pursuant to the present invention.
Figure 13:
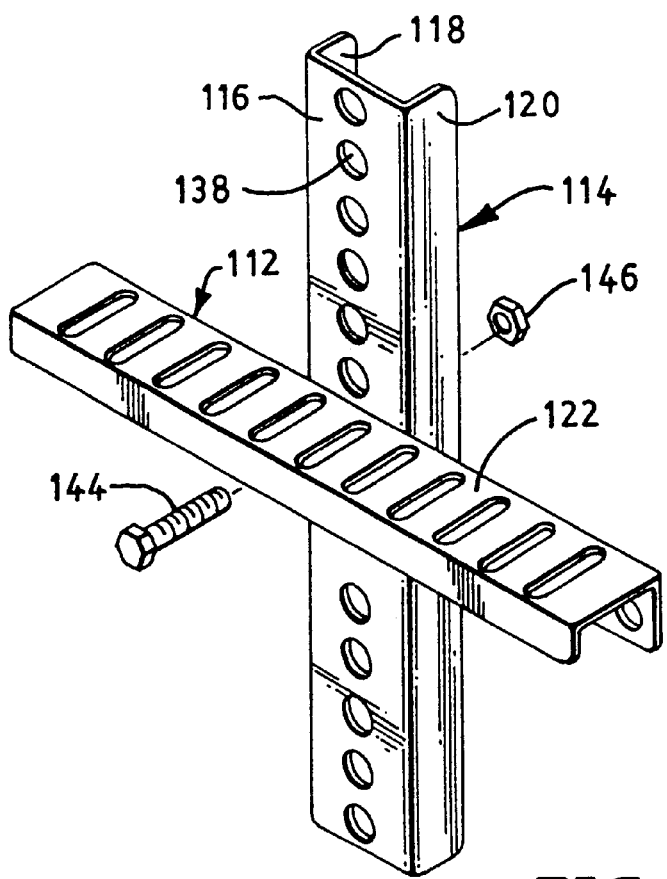
FIG. 13 is a perspective view of a partially assembled wireway incorporating the hanger of FIG. 12.
Figure 14:
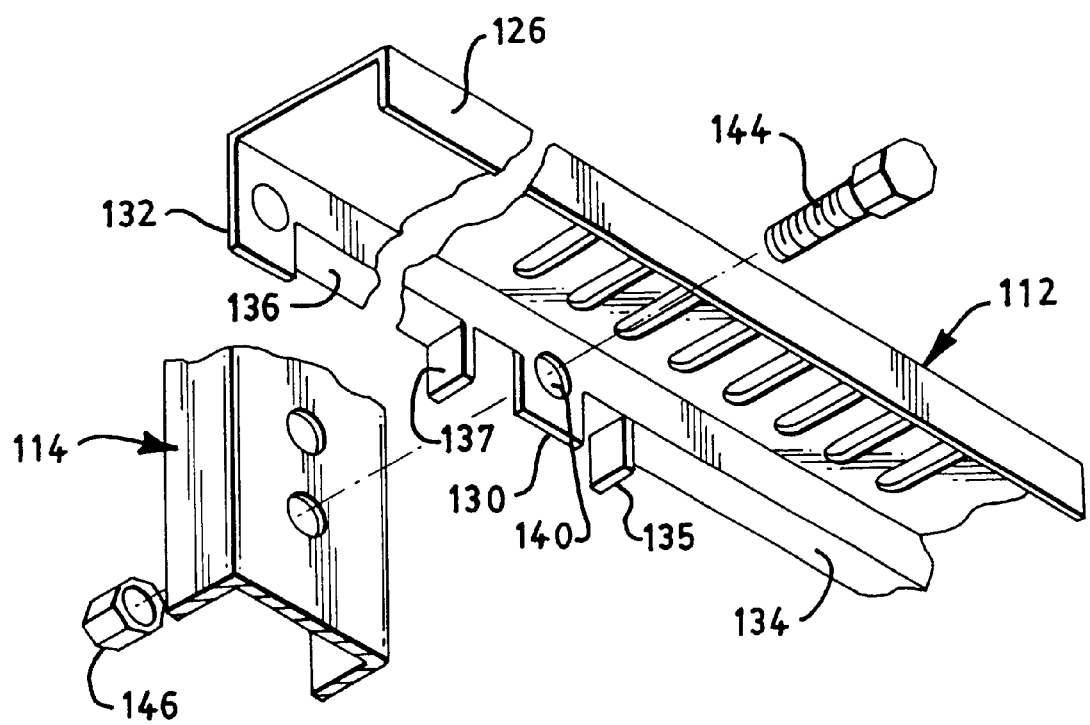
FIG. 14 is a broken-away exploded view of the wireway of FIG. 13.
Figure 15:
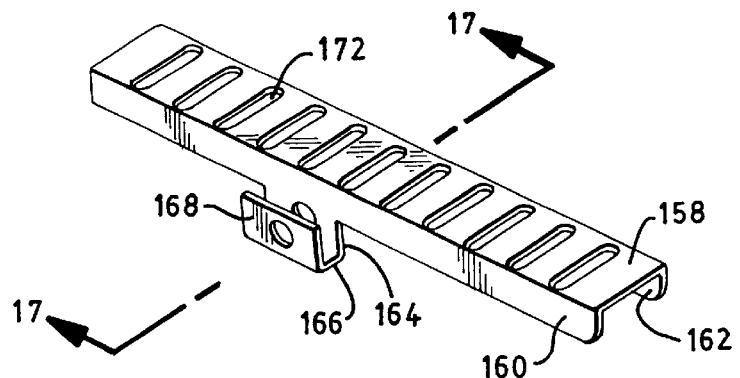
FIG. 15 is a perspective view of still another embodiment of a hanger pursuant to the present invention.
Figure 16:
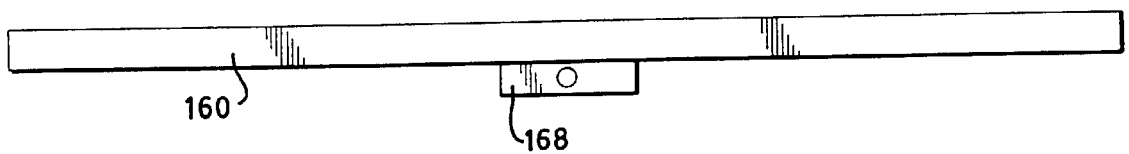
FIG. 16 is a front view of the hanger of FIG. 15.
Figure 17:
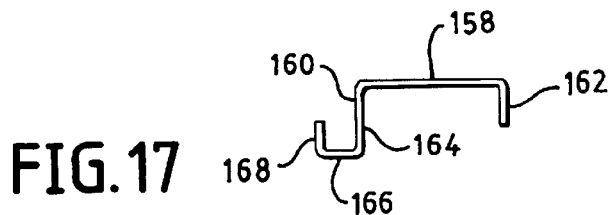
FIG. 17 is a cross-sectional view of the hanger of FIG. 15, taken along the line 17—17 of FIG. 16.

The Embodiment of FIGS. 12–14

The wireway assemblage of FIGS. 12–14, in accordance with the present invention, comprises a horizontally elongated crossbar hanger 112 that is designed to be mated with a conventional vertically elongated channel downcomer 114. Both the downcomer and the hanger are channels that are generally U-shaped in cross-section.

Downcomer 114 has, as integral components, a saddle portion 116 and a pair of equally deep wall portions 118 and 120 extending orthogonally therefrom. Hanger 112 has as integral components a saddle portion 122 and a pair of equally deep wall portions 124 and 126 extending orthogonally therefrom.

Integral with and extending from wall portion 124 is an arrangement of flanges 128, 130, 132, 134, 135, 136 and 137. Flanges 128, 130 and 132 extend downwardly from wall portion 124 in the same plane as does wall 124. Flanges 134 and 136 extend orthogonally in the same plane from wall 124 on opposite sides of flange 130. The inner ends of flanges 134 and 136 are folded downwardly to form two parallel flanges 135 and 137. These flanges lie on opposite sides of flange 130.

The saddle portion of the downcomer has a series of holes 138. For registration with one of these holes is a hole 140 in the adjacent regions of flange 130 and the associated wall portion of the hanger. A series of parallel transverse slots 142 in the saddle of the hanger are adapted to receive strapping by which a load of cables may be secured to the hanger.

When downcomer 114 and hanger 112 are assembled, as shown in FIG. 13, the inner faces of flanges 135 and 137 snugly receive the wall portions of downcomer 114, and flange 130 abuts against the saddle portion of downcomer 114. In this relationship, hole 140 is registered with a hole 138 of saddle portion 116. When the downcomer and the hanger are locked together by a bolt 144 and a nut 146, the assemblage is extremely tight and sturdy. At the same time, holes in flanges 128 and 132 can be aligned with holes in adjacent downcomers (not shown) for association with further nuts and bolts.

The Embodiment of FIGS. 15–19

The wireway assemblage of FIGS. 15 to 19, in accordance with the present invention, comprises a horizontally elongated hanger 148 that is designed to be mated with a conventional vertically elongated downcomer 150. Both the downcomer and the hanger are channels that are generally U-shaped in cross-section.

Downcomer 150 has, as integral components, a saddle portion 152 and a pair of equally deep wall portions 154 and 156 extending orthogonally therefrom. Hanger 148 has as integral components a saddle portion 158 and a pair of equally deep wall portions 160 and 162 extending orthogonally therefrom.

Integral with and extending from wall portion 160 is an arrangement of flanges 164, 166 and 168. Flange 164 extends downwardly from wall portion 160 in the same plane as does wall portion 160. Flange 166 extends orthogonally from the bottom edge of flange 164. Flange 168 extends upwardly from the outer edge of flange 166 in parallelism with flange 164.

The saddle portion of the downcomer has a series of holes 170. For registration with one of these holes are registered holes in flanges 164 and 168. A series of parallel transverse slots 1172 in the saddle portion of the hanger are adapted to receive strapping by which a load of cables may be secured to the hanger.

Figure 18:
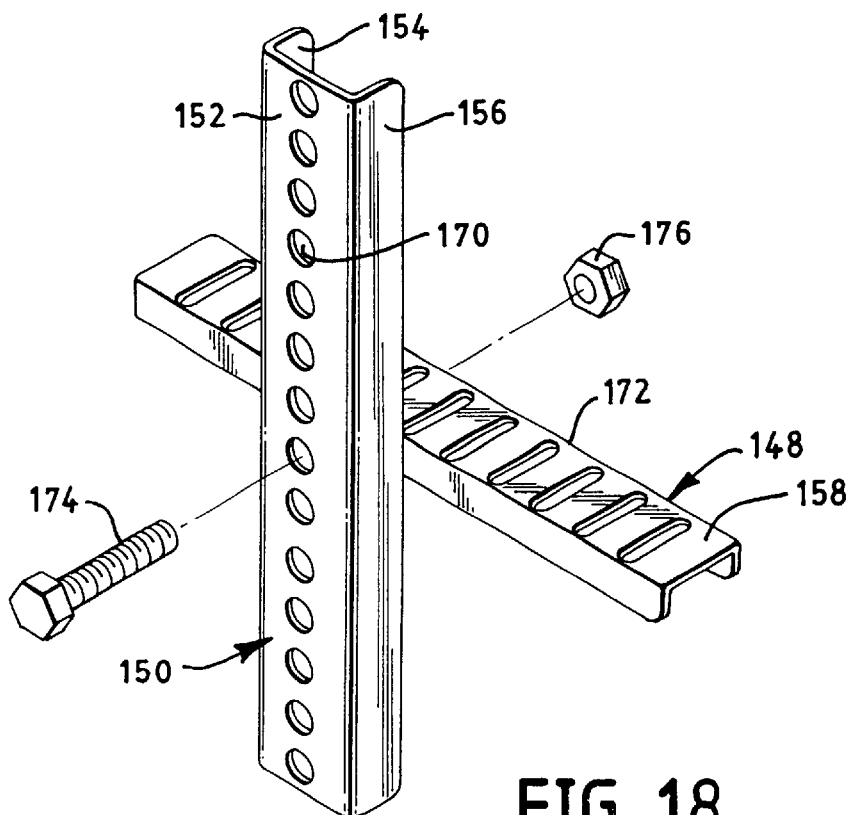
FIG. 18 is a perspective view of a partially assembled wireway incorporating the hanger of FIG. 15.
Figure 19:
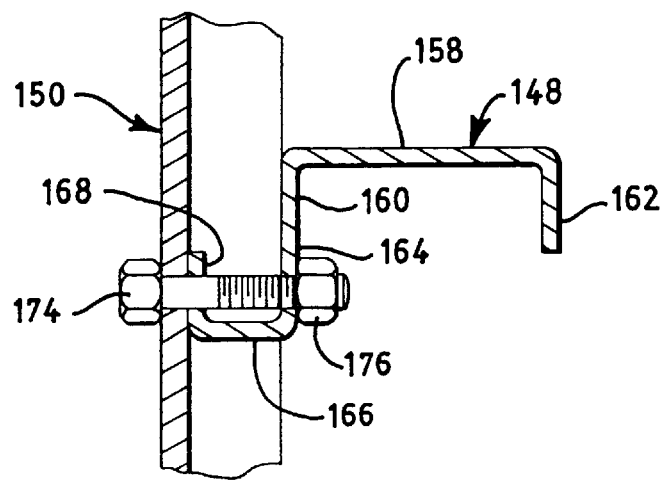
FIG. 19 is a broken-away cross-sectional view of the wireway of FIG. 18, fully assembled.

When downcomer 150 and hanger 148 are mated, as shown in FIG. 18, the inner edges of flanges 164, 166 and 168 are snugly received by the walls of downcomer 150. At the same time, flange 168 abuts against the inner face of the saddle portion of the downcomer, with a hole 170 and the holes in flanges 164 and 168 in registration. When the downcomer and the hanger are locked together by a bolt 174 and a nut 176, the assemblage is extremely tight and sturdy.

OPERATION

In operation, the horizontally elongated wireway hanger and the vertically elongated downcomer are mated in the following manner. Both the downcomer and the hanger are channels that are generally U-shaped in cross-section, each having as integral components a saddle portion and a pair of equally deep wall portions extending orthogonally therefrom. Integral with and extending from one of the wall portions is an arrangement of flanges that snugly abut against the saddle portion and the wall portions of the downcomer. The saddle portion of the crossbar is designed so that during assembly of the crossbar to the channel downcomer, the points of the hex nut interferes with the underside of the crossbar. This feature allows assembly, using only a wrench or ratchet tool applied to the head of the bolt. In prior art designs, it may be necessary to hold the hex nut firmly while the hex head bolt is tightened. Multiple crossbars can be attached to the channel downcomer. Due to the compact design of the crossbar, the corresponding mounting holes on the channel downcomer can be reduced to ¾" on center. This feature is in contrast to existing designs, which have 1" center to center hole spacing. This feature facilitates maximum capacity in confined spaces. The arrangement is such that mating particularly configured hangers of the present invention with conventional downcomers produces a wireway that is unusually simple to produce and to assemble, and unusually tight and secure in operation.

What is claimed is:

1. A horizontally elongated wireway hanger for assembly with a vertically elongated vertically elongated, generally U-shaped, wireway downcomer being in the form of a channel having a saddle portion and a pair of substantially equally deep wall portions extending orthogonally therefrom with a sequence of holes extending along said saddle portion therof, said wireway hanger downcomer, said wireway hanger being a component of a wireway system:
    (a) said hanger being in the form of a channel that is generally U-shaped in cross-section having as integral components a saddle portion and a pair of substantially equally deep wall portions extending orthogonallly therefrom;
    (b) an arrangement of flanges integral with and extending from a first wall portion of said hanger;
    (c) for registration with one of said holes in said downcomer, there being a hole in at least part of one of said flanges;
    (d) said holes being registered, said hanger and said downcomer being secured together by a nut and bolt, said bolt projecting through said registered holes;
    (e) a series of parallel transverse slots in said saddle portion of said hanger being adapted to receive strapping by which a load of conduits may be secured to said hanger;
    (f) said arrangement of flanges includes a first flange extending downwardly from said first wall portion in the same plane, a pair of flanges extending orthogonally from said first wall portion, inner ends of said pair of flanges being folded downwardly to form two parallel flanges lying on opposite sides of said first flange.

2. An elongated wireway hanger, said hanger being adapted for horizontal assembly with a vertically elongated assembly with a vertically elongated, generally U-shaped, wireway downcomer being in the form of a channel having a saddle portion and a pair of substantially equally deep wall portions extending orthogonally therefrom with a sequence of holes extending along said saddle portion thereof, said wireway hanger wireway downcomer, said wireway hanger and said wireway downcomer being components of a wireway system:
    (a) said hanger being in the form of a channel that is generally U-shaped in cross-section having as integral components a saddle portion and a pair of substantially equally deep wall portions extending orthogonally therefrom, and being composed of metal stock that is selected from the class consisting of mild steel, stainless steel, and aluminum, said metal stock ranging in thickness from 112 to 127 mils;
    (b) the saddle portion of said hanger having a sequence of transverse slots;
    (c) an integral configuration of folded sections extending from a forward wall of said hanger, each of said sections being substantially planar and having planar surfaces that are surfaces that are spaced a predetermined distance apart and are free of each other;
    (d) said sections including at least a tab in the plane of said forward wall and extending downwardly therefrom;
    (e) said sections including at least a flange extending orthogonally with respect to said forward wall;
    (f) said tab including a hole that is registrable with a hole of selected height in the saddle of said downcomer and by which said hanger may be bolted to said downcomer;
    (g) at least one edge of said flange being adapted to snugly abut against a surface of a wall of said downcomer so that much of any forces due to shock and vibration are transmitted transversely along the plane of said flange.

3. The elongated wireway hanger of claim 2, wherein said sections include two extended flanges on opposite sides of said tab extending forwardly from the lower edge of said forward wall of said hanger, the inner edges of said flanges being parallel and being adapted to snugly engage the outer faces of said walls of said downcomer.

4. The elongated wireway hanger of claim 2 wherein said sections include a horizontal flange and a pair of vertical flanges on opposite sides of said horizontal flange, said horizontal flange being integrally connected to the bottom edge of said tab said vertical flanges being integrally connected to opposed side edges of said tab, the opposed side edges of said horizontal flange snugly fitting against the inner faces of said walls of said downcomer, and the inner faces of said vertical flanges snugly fitting against the outer faces of said walls of said downcomer, when said hole in said tab is registered with a hole in said saddle of said downcomer.

5. The elongated wireway hanger of claim 2, wherein said sections include two extended flanges on opposite sides of said tab extending forwardly from the lower edge of said forward wall of said hanger, the inner edges of said flanges being parallel, and a pair of further flanges extending downwardly from said inner edges and being adapted to snugly engage the outer faces of said walls of said downcomer.

6. The elongated wireway hanger of claim 2, wherein said sections include a forwardly extending flange extending from the lower edge of said tab and an upwardly extending flange extending from the forward edge of said forwardly extending flange, the side edges of said forwardly extending flange and of said upwardly extending flange being adapted to snugly engage the inner faces of said walls of said downcomer.

7. A wireway combination comprising an elongated wireway hanger and an elongated wireway downcomer, said hanger and said downcomer being adapted for assembly with said hanger extending horizontally and said downcomer extending vertically:
    (a) both said downcomer and said hanger being in the form of channels that are generally U-shaped in cross-section, each having as integral components a saddle portion and a pair of substantially equally deep wall portions extending orthogonally therefrom, and each being composed of metal stock that is selected from the class consisting of mild steel, stainless steel, and aluminum, said metal stock ranging in thickness from 112 to 127 mils;
    (b) the saddle portion of said downcomer having a sequence of holes;
    (c) the saddle portion of said hanger having a sequence of transverse slots;

(d) an integral configuration of folded sections extending from a forward wall of said hanger, each of said sections being substantially planar and having planar surfaces that are surfaces that are spaced a predetermined distance apart and are free of each other;

(e) said sections including at least a tab in the plane of said forward wall and extending downwardly therefrom;

(f) said sections including at least a flange extending orthogonally with respect to said forward wall;

(g) said tab includeing a hole that is registrable with a hole of selected height in the saddle of said downcomer and by which said hanger may be bolted to said downcomer;

(h) at least one edge of said flange being adapted to snugly abut against a surface of a wall of said downcomer so that much of any forces due to shock and vibration are transmitted transversely along said plane of said flange.

8. The wireway combination of claim 7 wherein said sections include two extended flanges on opposite sides of said tab extending forwardly from the lower edge of said forward wall of said hanger, the inner edges of said flanges being parallel and being adapted to snugly engage the outer faces of said walls of said downcomer.

9. The wireway combination of claim 7 wherein said sections include a horizontal flange and a pair of vertical flanges on opposite sides of said horizontal flange, said horizontal flange being integrally connected to the bottom edge of said tab, said vertical flanges being integrally connected to opposed side edges of said tab, the opposed side edges of said horizontal flange snugly fitting against the inner faces of said walls of said downcomer, and the inner faces of said vertical flanges snugly fitting against the outer faces of said walls of said downcomer, when said hole in said tab is registered with a hole in said saddle of said downcomer.

10. The wireway combination of claim 7, wherein said sections include two extended flanges on opposite sides of said tab extending forwardly from the lower edge of said forward wall of said hanger, the inner edges of said flanges being parallel, and a pair of further flanges extending downwardly from said inner edges and being adapted to snugly engage the outer faces of said walls of said downcomer.

11. The wireway combination of claim 7, wherein said sections include a forwardly extending flange extending from the lower edge of said tab and an upwardly extending flange extending from the forward edge of said forwardly extending flange, the side edges of said forwardly extending flange and of said upwardly extending flange being adapted to snugly engage the inner faces of said walls of said downcomer.

\* \* \* \* \*